(12) United States Patent
Yang et al.

(10) Patent No.: US 10,091,333 B2
(45) Date of Patent: Oct. 2, 2018

(54) SYSTEM AND METHOD FOR SUPPORTING A BYPASS-DOMAIN MODEL FOR ACROSS-DOMAIN MESSAGING IN A TRANSACTIONAL MIDDLEWARE MACHINE ENVIRONMENT

(71) Applicant: Oracle International Corporation, Redwood Shores, CA (US)

(72) Inventors: Lin Yang, Beijing (CN); Xiangdong Li, Beijing (CN); Yunrong Zheng, Beijing (CN); Yunhao Wang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 639 days.

(21) Appl. No.: 14/602,037

(22) Filed: Jan. 21, 2015

(65) Prior Publication Data
US 2015/0312376 A1 Oct. 29, 2015

Related U.S. Application Data

(60) Provisional application No. 61/985,156, filed on Apr. 28, 2014.

(51) Int. Cl.
*G06F 15/167* (2006.01)
*H04L 29/06* (2006.01)
(Continued)

(52) U.S. Cl.
CPC .............. *H04L 67/42* (2013.01); *G06F 9/466* (2013.01); *G06F 9/467* (2013.01); *G06F 9/5055* (2013.01);
(Continued)

(58) Field of Classification Search
CPC .......... H04L 67/42; H04L 67/10; G06F 9/467
See application file for complete search history.

(56) References Cited

U.S. PATENT DOCUMENTS 9,021,112 B2 4/2015 Slocombe
9,110,851 B2 8/2015 Little
(Continued)

FOREIGN PATENT DOCUMENTS

WO WO03019369 3/2003

OTHER PUBLICATIONS

European Patent Office, International Searching Authority, International Search Report and Written Opinion dated Jul. 29, 2015 for International Application No. PCT/US2015/022835, 11 pages.

*Primary Examiner* — Tonia L Dollinger
*Assistant Examiner* — Steven C Nguyen
(74) *Attorney, Agent, or Firm* — Tucker Ellis LLP

(57) ABSTRACT

A system and method can support across-domain messaging in a transactional middleware machine environment. A transaction domain can import one or more services from a remote transaction domain, wherein said one or more services are registered in a service table that is associated with the transaction domain. Furthermore, a client in the transaction domain can find from the service table a remote server in the remote transaction domain that provides said one or more services, and send a message directly to the remote server to invoke said one or more services by passing one or more domain gateway servers in both the transaction domain and the remote transaction domain.

16 Claims, 10 Drawing Sheets

(51) Int. Cl.

| | |
|---|---|
| *G06F 9/46* | (2006.01) |
| *H04L 29/08* | (2006.01) |
| *H04L 9/32* | (2006.01) |
| *G06Q 10/10* | (2012.01) |
| *G06F 9/50* | (2006.01) |
| *G06F 9/54* | (2006.01) |

(52) U.S. Cl.
CPC .............. *G06F 9/546* (2013.01); *G06F 9/547* (2013.01); *G06F 15/167* (2013.01); *G06Q 10/10* (2013.01); *H04L 9/3234* (2013.01); *H04L 9/3247* (2013.01); *H04L 63/101* (2013.01); *H04L 67/10* (2013.01); *H04L 67/2838* (2013.01); *G06F 2209/5015* (2013.01)

(56) References Cited

U.S. PATENT DOCUMENTS

| | | | |
|---|---|---|---|
| 2004/0103413 A1 | 5/2004 | Mandava et al. | |
| 2006/0020688 A1 | 1/2006 | Chang | |
| 2007/0144625 A1 | 6/2007 | Sacedon | |
| 2008/0144625 A1 | 6/2008 | Wu | |
| 2009/0024851 A1* | 1/2009 | Andrade | H04L 9/3234 |
| | | | 713/176 |
| 2011/0040875 A1 | 2/2011 | Scholz | |
| 2013/0086196 A1* | 4/2013 | Shi | G06F 15/167 |
| | | | 709/212 |
| 2013/0086238 A1* | 4/2013 | Li | G06F 9/505 |
| | | | 709/223 |
| 2013/0173720 A1* | 7/2013 | Vasudev | H04L 51/18 |
| | | | 709/206 |
| 2014/0164563 A1 | 6/2014 | Leekley | |
| 2014/0244851 A1 | 8/2014 | Lee | |
| 2015/0317183 A1 | 11/2015 | Little | |

\* cited by examiner

SYSTEM AND METHOD FOR SUPPORTING A BYPASS-DOMAIN MODEL FOR ACROSS-DOMAIN MESSAGING IN A TRANSACTIONAL MIDDLEWARE MACHINE ENVIRONMENT

CLAIM OF PRIORITY

This application claims priority to U.S. Provisional Patent Application No. 61/985,156, filed Apr. 28, 2014 entitled "ACROSS-DOMAIN MESSAGING WITH BYPASSING DOMAIN GATEWAY", which application is herein incorporated by reference in its entirety.

CROSS REFERENCE TO RELATED APPLICATIONS

This application is related to the following patent applications, each of which is hereby incorporated by reference in its entirety:

U.S. patent application Ser. No. 14/602,039, filed Jan. 21, 2015 entitled "SYSTEM AND METHOD FOR UPDATING SERVICE INFORMATION FOR ACROSS-DOMAIN MESSAGING IN a TRANSACTIONAL MIDDLEWARE MACHINE ENVIRONMENT"; and U.S. patent application Ser. No. 14/602,041, filed Jan. 21, 2015 entitled "SYSTEM AND METHOD FOR SUPPORTING A PROXY MODEL FOR ACROSS-DOMAIN MESSAGING IN a TRANSACTIONAL MIDDLEWARE MACHINE ENVIRONMENT". All of which applications are incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Described herein are systems and methods that can support across-domain messaging in a transactional middleware machine environment. A transaction domain can import one or more services from a remote transaction domain, wherein said one or more services are registered in a service table that is associated with the transaction domain. Furthermore, a client in the transaction domain can find from the service table a remote server in the remote transaction domain that provides said one or more services, and send a message directly to the remote server to invoke said one or more services bypassing one or more domain gateway servers in both the transaction domain and the remote transaction domain.

DETAILED DESCRIPTION

Figure 1:
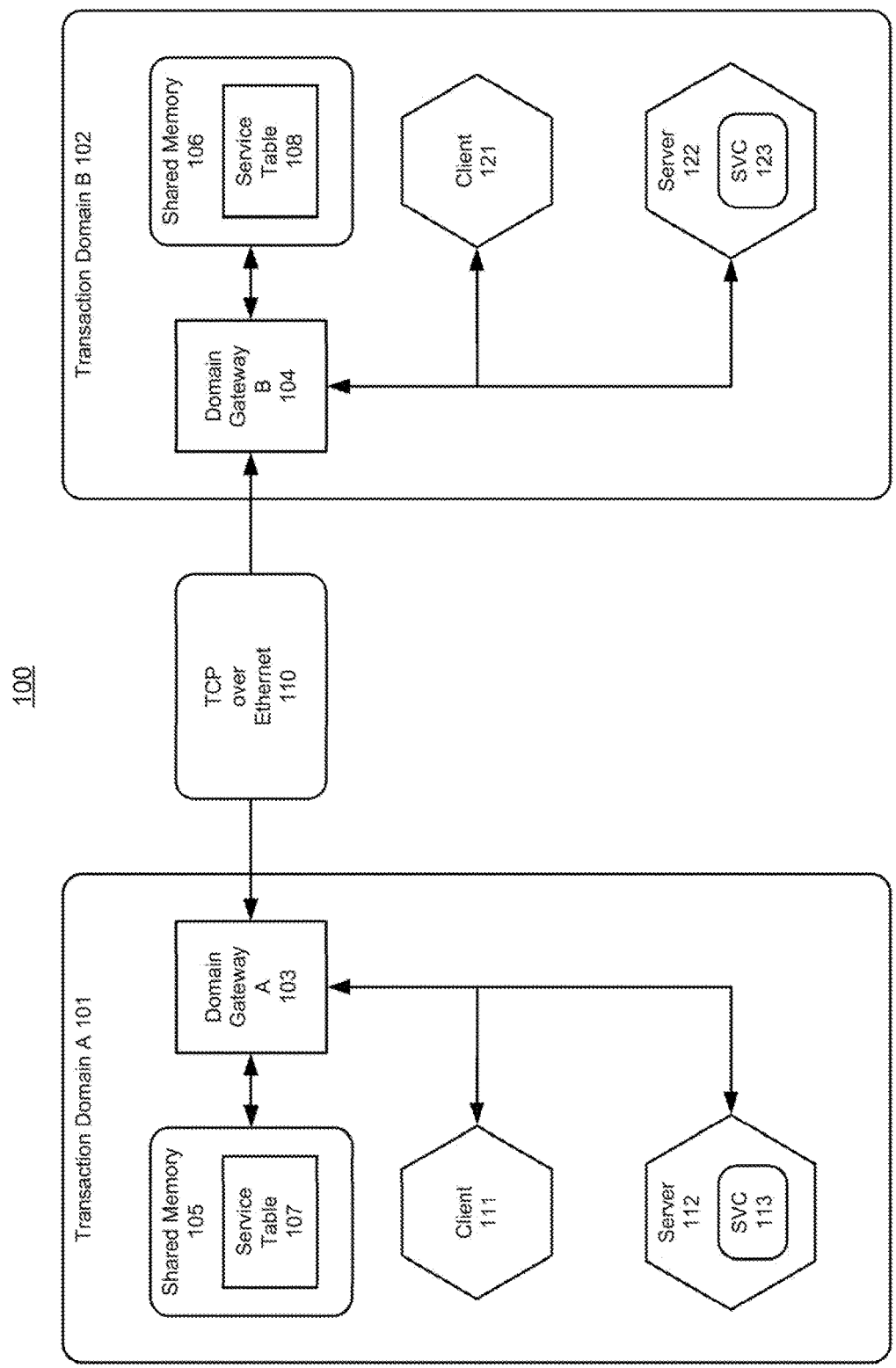
FIG. 1 shows an illustration of supporting across-domain messaging via domain gateways in a transactional middleware machine environment, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Tuxedo environment as an example for a transactional middleware machine environment. It will be apparent to those skilled in the art that other types of transactional middleware machine environments can be used without limitation.

Described herein are systems and methods that can support a transactional middleware machine environment.

Transactional Middleware Machine Environment

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, the system provides an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, a transactional middleware system, such as the Oracle Tuxedo system, can take advantage of fast machines with multiple processors, such as an Oracle Exalogic middleware machine, and a high performance network connection, such as an IB network. Additionally, the Oracle Tuxedo system can take advantage of a clustered database, such as the Oracle Real Application Clusters (RAC) Enterprise database, which is a clustered database with shared cache architecture and can be a component of a cloud architecture. The Oracle RAC can overcome the limitations of traditional shared-nothing and shared-disk approaches to provide highly scalable and available database solutions for business applications.

In accordance with an embodiment of the invention, Oracle Tuxedo system provides a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

Across-Domain Messaging

In accordance with an embodiment of the invention, the transactional middleware machine environment can support across-domain messaging based on the domain gateway servers.

The domain gateway servers can be responsible for connecting a local domain to a remote domain, advertising the imported services to the local domain, acting as a proxy for transferring the request/response among between two domains, and acting as a subordinator for a transaction. For example, the GWTDOMAIN process, which resides on the domain gateway servers in Tuxedo, can communicate with other GWTDOMAIN processes in remote domains and supports inter-domain communication.

FIG. 1 shows an illustration of supporting across-domain messaging via domain gateways in a transactional middleware machine environment, in accordance with an embodiment of the invention. As shown in FIG. 1, a transactional middleware machine environment 100, e.g. a Tuxedo system, can include multiple domains, such as a transaction domain A 101 with a domain gateway A 103 and a transaction domain B 102 with a domain gateway B 104.

Furthermore, the transaction domains A-B 101-102 in the transactional middleware machine environment 100 can store service related information in the service tables 107-108, e.g. in the shared memory 105-106. For example, the Tuxedo system can take advantage of a bulletin board (BB), which use a shared memory for containing information associated with various processes in the different applications, such as the information defined in the UBBCONFIG file and other statistical and location information.

As shown in FIG. 1, the client 111 in the transaction domain A 101 can check a service table 107 in the shared memory 105 for obtaining an address of a server 122, which host a target service (e.g. SVC 123) in the transaction domain B 102. Then, the client 111 can send a message to the domain gateway A 103, which forwards the message to the domain gateway B 104 in the remote transaction domain B 102, e.g. via a network connection based on the transmission control protocol (TCP) protocol over an Ethernet network 110.

Furthermore, the domain gateway B 104 can send the received message to the target server 122 in the transaction domain B 102. Correspondingly, the target server 122, which hosts the target service (i.e. SVC 123) can send the answer to the client 111 via the same path.

Additionally, the client 121 in the transaction domain B 102 can check a service table 108 in the shared memory 106 for obtaining an address of a server 112, which host a target service (e.g. SVC 113) in the transaction domain A 101. Then, the client 121 can invoke the target service via the domain gateway A 103 and the domain gateway B 104.

In accordance with an embodiment of the invention, the messaging system may need to perform different packing and unpacking operations at the domain gateway servers, such as the domain gateway A 103 and the domain gateway B 104, for transmitting messages across domains, e.g. via various inter-process communication (IPC) queues or a remote direct memory access (RDMA) queues in the transactional middleware machine environment 100.

For example, in Tuxedo, the client 111 can send a message to the local GWTDOMAIN process via an IPC queue, after the client 111 obtains an address to a target server 122 in the remote domain from the bulletin board (BB).

Then, the GWTDOMAIN process can unpack the IPC message and determine to which remote gateway (i.e. another GWTDOMAIN process in a remote domain) the message should be routed. Furthermore, the GWTDOMAIN process can pack the message as a network message and sends the network message to the remote GWTDOMAIN server.

After receiving the network message, the GWTDOMAIN process can unpack the network message, before packing the message into an IPC message and sending the message to the server through a local IPC queue. Finally, the server 122 can retrieve the message from a local IPC queue.

Thus, the domain gateway servers, such as the domain gateway A 103 and the domain gateway B 104, may become the bottleneck in a high concurrence scenario, since the packing operations and unpacking operations can have a negative impact on the performance of the messaging system.

Bypass Domain Model

In accordance with an embodiment of the invention, the transactional middleware machine environment can support across-domain messaging based on a bypass-domain model (a.k.a. a bypass domain model).

Using the bypass-domain model, when an imported service is invoked, the system can utilize a network protocol, with high performance and low latency, for delivering the messages directly to the remote domain, instead of transferring messages across the gateway domain servers.

For example, in Tuxedo, the system can skip the GWTDOMAIN processes by utilizing the IB network for transferring messages. The IB network can support remote data access that allows the local client to write data directly to the memory in a remote node.

Figure 2:
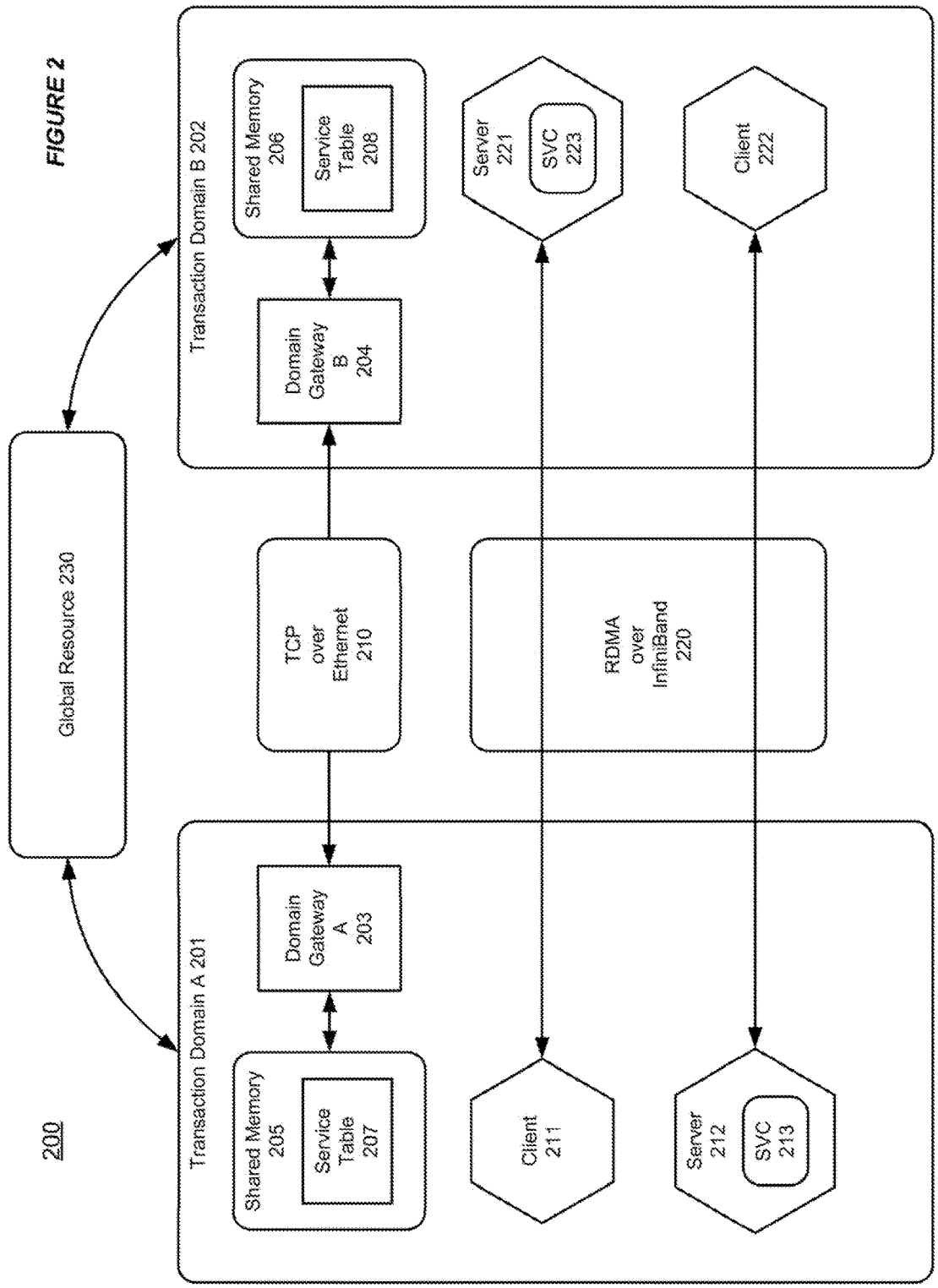
FIG. 2 shows an illustration of supporting across-domain messaging with bypassing domain gateways in a transactional middleware machine environment, in accordance with an embodiment of the invention.

FIG. 2 shows an illustration of supporting across-domain messaging with bypassing domain gateways in a transactional middleware machine environment, in accordance with an embodiment of the invention. As shown in FIG. 2, a transactional middleware machine environment 200, e.g. the Tuxedo environment, can include multiple domains, such as a transaction domain A 201 with a domain gateway A 203 and a transaction domain B 202 with a domain gateway B 204.

In accordance with an embodiment of the invention, the transaction domain A 201 and the transaction domain B 202 can use a global resource 230 for exchanging various information (e.g. during the start-up of the system). For example, the Tuxedo system can either implement a server through which different domain gateway servers can exchange information or share information using the network file system (NFS) files. Thus, the Tuxedo domain can obtain various machine and transaction information, such as the machine identifier (MID), group number (GRPID), and transaction management server (TMS) services information, from an indirectly connected domain via the global resource 230.

Furthermore, the transaction domains A-B 201-202 in the transactional middleware machine environment 200 can store various machine and service related information, e.g. in the shared memory 205-206. For example, the Tuxedo system can take advantage of a bulletin board (BB), which may include various tables storing various machine and service related information for both the local and remote domains. These tables can include the node table, the process (PE) table, the server group table, the service table, the routing table, and the routing data table (among which the node table and the process (PE) table may be divided into multiple sections, i.e. with one section for a single domain).

Using the bypass-domain model, the gateway domain A-B 203-204 can register the imported service-related information in the service tables 207-208 in the local shared memory 205-206 (e.g. the Tuxedo BB).

Thus, the client 211 or 222 can obtain, from the local service tables 207-208, an address for a remote service 223 or 213, which are imported by a local domain gateway 203-204. Then, the client 211 or 222 can send a request to invoke the remote service. Here, the invocation of the remote service can be based on the RDMA over IB network 220, instead of the TCP over Ethernet network 210.

For example, the client 211 can find the provider for a target service (e.g. SVC 223) in the service table 207 in the local shared memory 205, and send the message directly to the remote server 221, e.g. via a RDMA queue. Also, the client 222 can find the provider for a target service (e.g. SVC 213) in the service table 208 in the local shared memory 206, and send the message directly to the remote server 212, e.g. via a RDMA queue.

Figure 3:
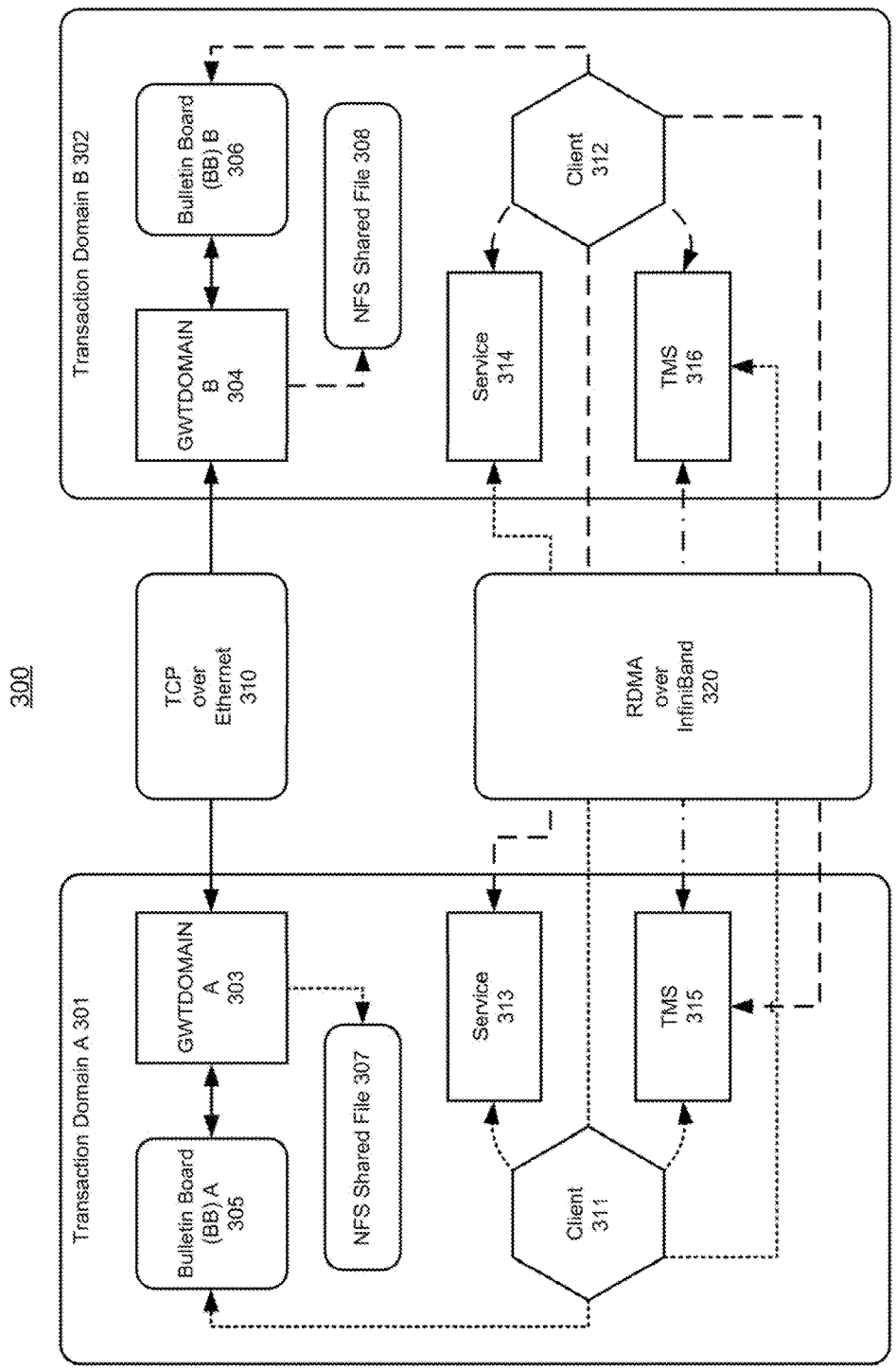
FIG. 3 shows an illustration of supporting across-domain messaging in a transactional middleware machine environment, in accordance with an embodiment of the invention.

FIG. 3 shows an illustration of supporting across-domain messaging in a transactional middleware machine environment, in accordance with an embodiment of the invention. As shown in FIG. 3, a transactional middleware machine environment 300, e.g. the Tuxedo environment, can include multiple domains, such as the transaction domain A-B 301-302.

As shown in FIG. 3, the GWTDOMAIN A 303, which is a domain gateway server in the transaction domain A 301, can write the service and transaction information from the local bulletin board (BB) A 305 into the NFS shared files 307; and the GWTDOMAIN B 304, which is a domain gateway server in the transaction domain B 302, can write the service and transaction information from the local BB B 306 into the NFS shared file 308. Both the NFS shared files 307 and the NFS shared file 308 can be shared by the transaction domain A 301 and the transaction domain B 302.

Furthermore, the service and transaction information can be related to the different services 313-314 and/or the transaction management servers (TMSs) 315-316. In Tuxedo, such information can include the machine, group, TMS information.

For example, in order to import the service 314 from the remote transaction domain B 304, the GWTDOMAIN A 303 can read the information from the NFS file 308 in the transaction domain B 304 during the system start-up and/or after the establishment of a connection. Furthermore, the transaction domain A 301 can register the service 314 (e.g. the RDMAQ address in the transaction domain B 302) in a local bulletin board (BB) A 305.

Then, the client 311 in the transaction domain A 301 can look in the local bulletin board (BB) A 305 to find a remote server that provides the target service 314 (in the transaction domain B 102). After obtaining the address information of the remote server in the transaction domain B 302, the client 311 can invoke the target service 314 by sending a message directly to the remote server, e.g. via a network connection based on the remote direct memory access (RDMA) over InfiniBand (IB) 320 network (bypassing the gateway servers A-B 303-304).

Similarly, the client 312 can invoke the target service 313 by sending a message directly to the remote server bypassing the gateway servers A-B 303-304. Also, the client 311 or 312, when acting as a committer and/or a coordinator of a transaction, is able to obtain both the local and remote TMSes 315-316.

Additionally, the client 311 or 312 can send the message to a remote server using the domain gateways A-B 303-304 via the TCP over Ethernet network 310.

Thus, the system can significantly improve the across-domain messaging performance of the messaging system by taking advantage of the bypass-domain model. Also, a transaction can be propagated across domain without subordination.

Figure 4:
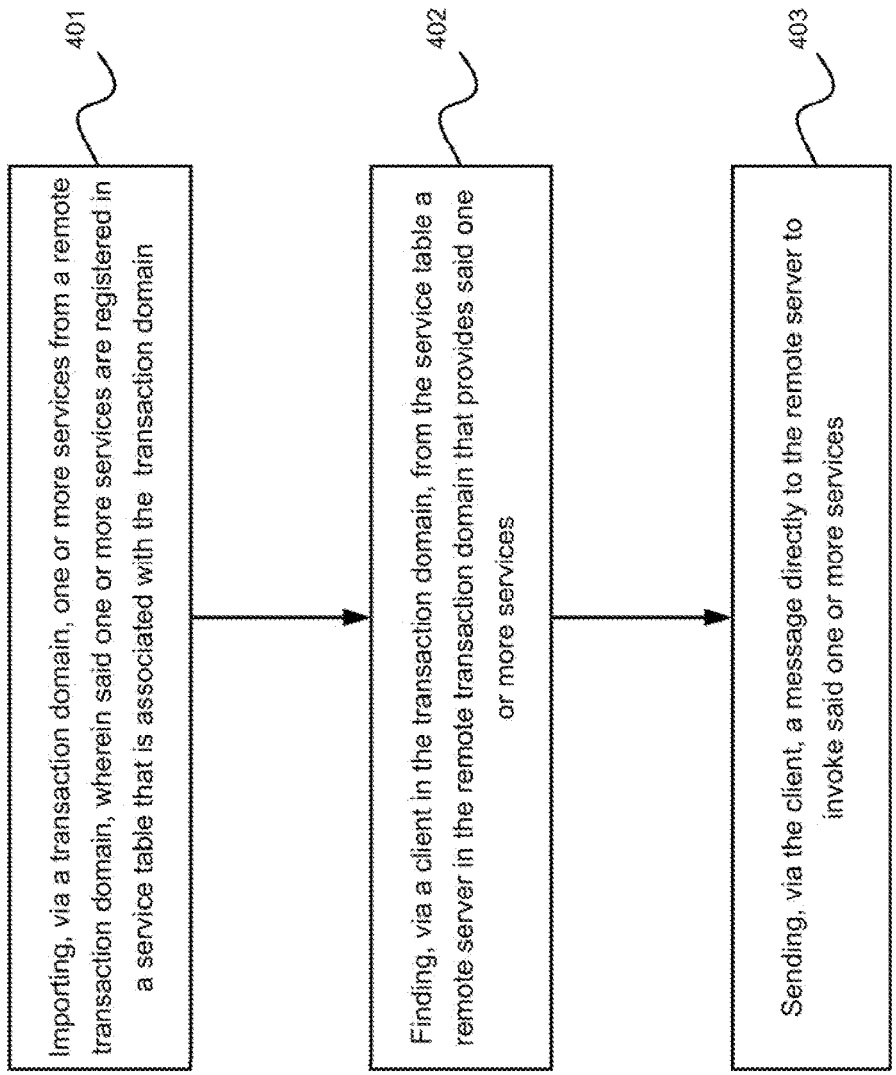
FIG. 4 illustrates an exemplary flow chart for supporting across-domain messaging in a transactional middleware machine environment, in accordance with an embodiment of the invention.

FIG. 4 illustrates an exemplary flow chart for supporting across-domain messaging in a transactional middleware machine environment, in accordance with an embodiment of the invention. As shown in FIG. 4, at step 401, a transaction domain can import one or more services from a remote transaction domain, wherein said one or more services are registered in a service table that is associated with the transaction domain. Then, at step 402, a client in the transaction domain can find a remote server in the remote transaction domain that provides said one or more services from the service table. Furthermore, at step 403, the client can send a message directly to the remote server to invoke said one or more services.

Bypass-Domain Group

In accordance with an embodiment of the invention, a bypass-domain group can include a set of domains that inter-connect with each other, directly or indirectly, based on the bypass-domain model.

Figure 5:
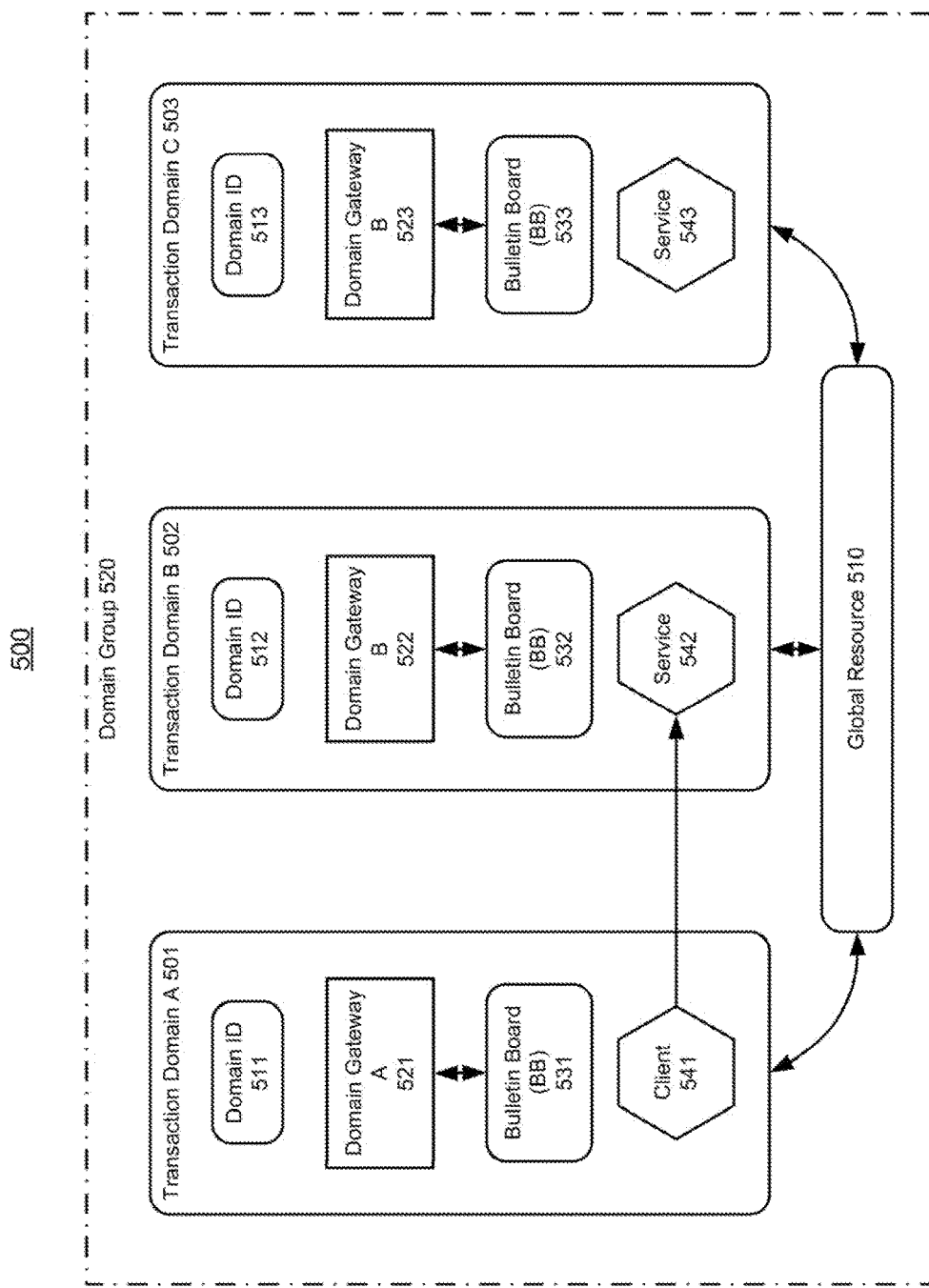
FIG. 5 shows an illustration of supporting a bypass-domain group in a transactional middleware machine environment, in accordance with an embodiment of the invention.

FIG. 5 shows an illustration of supporting a bypass-domain group in a transactional middleware machine environment, in accordance with an embodiment of the invention. As shown in FIG. 5, a transactional middleware machine environment 500, e.g. a Tuxedo system, can include a bypass-domain group 520, which includes multiple domains, such as the transaction domains A-C 501-503 with domain gateways A-C 521-523.

Furthermore, the different transaction domains A-C 501-503 can share information in a global resource 510 within the bypass-domain group 520. For example, the Tuxedo system can use the network file system (NFS) for sharing the machine identifier (MID), the group number (GRPID), the transaction management server (TMS), and routing (DDR) information, which are stored in the local bulletin boards (BBs) 531-533. In Tuxedo, each transaction domain can utilize a network file system (NFS) file, in which the global resources 510 are provided. Additionally, the NFS files can be accessed by the different domains in the bypass-domain group 520.

In accordance with an embodiment of the invention, each domain in the bypass-domain group 520 can be associated with a domain identifier (ID). For example, the transaction domains A 501 can be associated with a domain ID 511, the transaction domains B 502 can be associated with a domain ID 512, and the transaction domains C 503 can be associated with a domain ID 513.

Furthermore, each domain in the bypass-domain group 520 can take advantage of a set of identifiers (such as the MIDs and the GRPIDs), which are unique within each single domain. However, these identifiers may not be able to maintain their uniqueness after the services 542-543 are imported across domains (as part of the service information).

In accordance with an embodiment of the invention, each domain ID can include (or be represented by) a domain sequence number (such as the DMSQNM in Tuxedo, which is a unique number that identifies a particular domain within a domain group 520).

For example, using the domain sequence number, Tuxedo can re-construct a MID using the DMSQNM as a part of the MID, and combining the GRPIDs with the DMSQNMs. Thus, the Tuxedo system can keep the uniqueness of the identifiers (e.g. the MID and the GRPID) in across-domain messaging.

In accordance with an embodiment of the invention, the system can propagate a list of unique domain sequence numbers for supporting a transaction.

In Tuxedo, the system can propagate a list of DMSQNMs along with GRPIDs and add the DMSQNM to the global transaction table entry (GTTE). Then, a committer (or TMS_MANAGE) can use a combined DMSQNM and GRPID for determining a proper TMS (i.e. identifying the TMSes that are involved in a transaction).

Thus, the committer of a transaction can be aware of all TMS services across the transaction domains A-C 501-503, when a client 541 invokes a remote service 542 directly.

Also, the GWTDOMAIN process may not need to participate in a transaction as a transaction management server (TMS). Also, the GWTDOMAIN process may not need to know whether the remote service 542 invoked by the client 541 will call other remote services (e.g. service 543) or not.

Updating Service Information

Figure 6:
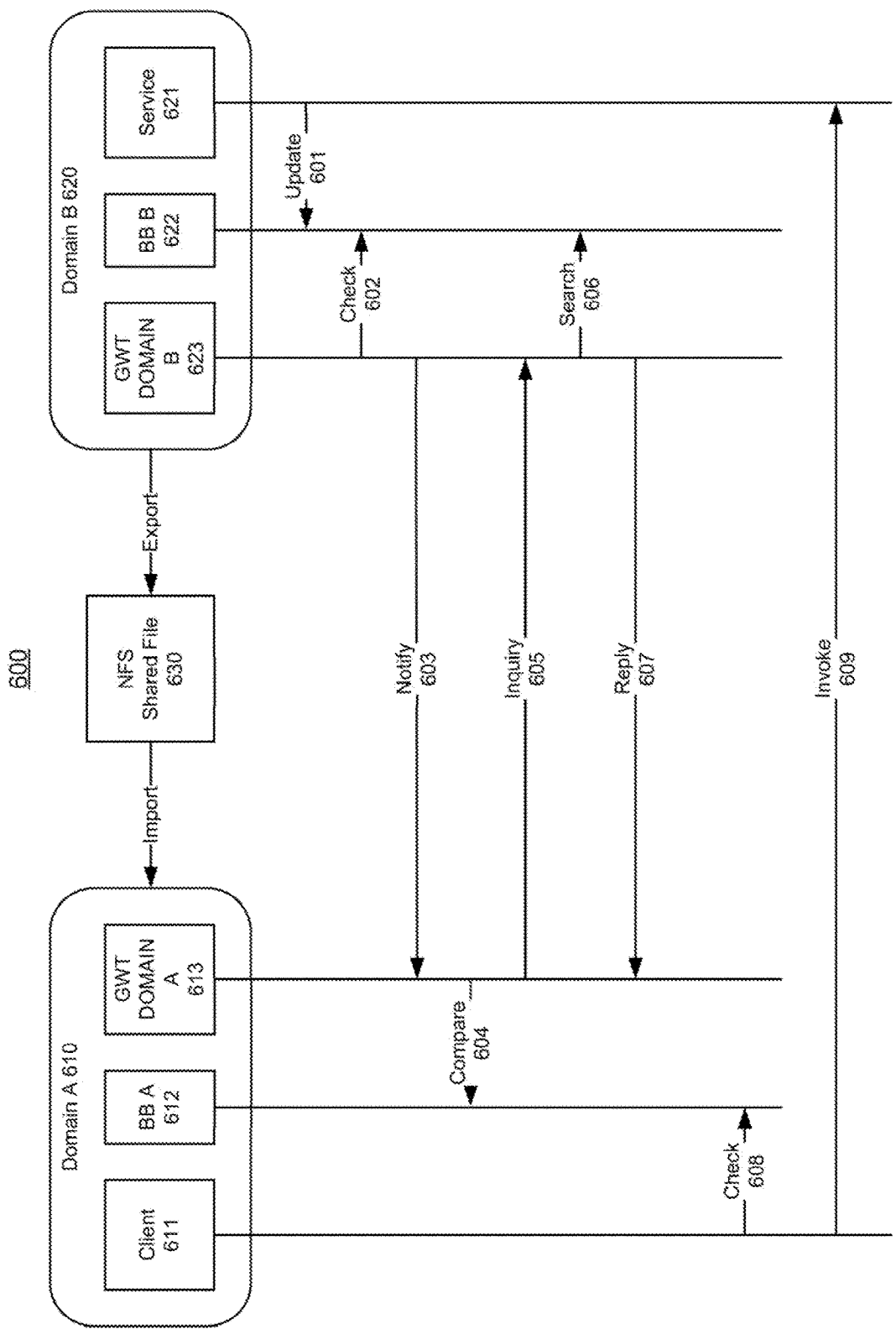
FIG. 6 shows an illustration of sharing and updating the service information that supports across-domain messaging in a transactional middleware machine environment, in accordance with an embodiment of the invention.

FIG. 6 shows an illustration of sharing and updating the service information that supports across-domain messaging in a transactional middleware machine environment, in accordance with an embodiment of the invention. As shown in FIG. 6, a transactional middleware machine environment 600 (e.g. the Tuxedo system), can include multiple domains, such as a transaction domain A 610 and a transaction domain B 620.

Furthermore, the GWTDOMAIN B 623, which is a domain gateway server in the transaction domain B 620, can export the machine and transaction related information from a local BB B 622 into a shared NFS file 630. Then, the GWTDOMAIN A 613, which is a domain gateway server in the transaction domain A 610, can import the machine and transaction related information from the shared NFS file 630 into the local BB A 612.

For example, Tuxedo can implement two operations, GWEV_RDMA_EXPORTLBB and GWEV_RDMA_IMPORTRBB, which may be scheduled at every tick-tock, for performing the export and import operations respectively.

The GWTDOMAIN B 623 can use the GWEV_RDMA_EXPOETLBB operation for exporting the local MIDs, GRPIDs, and TMS information, which can be used by other domain nodes for performing the application to transaction monitor interface (ATMI) invocations. The GWEV_RDMA_EXPOETLBB operation can compare the version associated with the local BB B 622 with the last written BB version, and can write the resource, machine, group, and TMS service information to the shared file 630.

The GWTDOMAIN A 613 can use the GWEV_RDMA_IMPORTRBB operation for importing the MID, GRPID, and TMS information from every domain in a domain group (i.e. for sequence number from 0 to MAX-DOMAIN), based on the predefined NFS files. The GWEV_RDMA_IMPORTRBB operation may also import information from the shared NFS files whose domain is indirectly connect to the domain. The GWEV_RDMA_IMPORTRBB operation can compare the version associated with the local BB A 612 with the last written BB version, and reads the resource, machine, group, and TMS service information from the shared file 630.

As shown in FIG. 6, the system can handle a change in a remote service 621, based on different domain gateway servers (such as the GWTDOMAIN A 613 and the GWTDOMAIN B 623).

At step 601, the system can update the BB B 622 after the service 621 changes.

At step 602, the GWTDOMAIN B 623 can check a version associated with the BB B 622. For example, Tuxedo can invoke a gw_rdma_check_BB_change( ) function call periodically based on the scheduled tick-tock. This function can loop through every domain in the domain group (i.e. 0 to MAXDOMAIN) and compares a version associated with the shared file 630.

At step 603, if any service has been changed in the BB B 622, the GWTDOMAIN B 623 may notify all connected domains, e.g. by sending a GWEV_NW_BBCHG_NOTIFY message to every connected gateway.

At step 604, when a domain gateway server in the domain A 610, e.g. the GWTDOMAIN A 613, receives a notification message from a remote domain B 620, the domain gateway server can determine a list of services to be imported from the remote domain B 620, e.g. by comparing the BB version in the GWEV_NW_BBCHG_NOTIFY message with the version of the local BB A 612.

At step 605, the GWTDOMAIN A 613 can send an inquiry message (e.g. a GWEV_NW_INQRDOMDATA message) to the GWTDOMAIN B 623 for the services to be imported from the remote domain B 620.

At step 606, when the GWTDOMAIN B 623 receives a GWEV_NW_INQRDOMDATA message, the GWTDOMAIN B 623 can retrieve the service names from the data package and search the local BB B 622 for various machine and service information (such as the RDMAQ addresses).

At step 607, the GWTDOMAIN B 623 can send a response (e.g. a GWEV_NW_INQRDOMDATA_RPLY message) back to the GWTDOMAIN A 613, and wait for the next scheduled time.

At step 608, a client 611 in the domain A 610 can check the local BB A 612 and obtains the RDMAQ address for the target service 621.

At step 609, the client 611 can invoke the target service 621 in the remote domain directly.

In accordance with an embodiment of the invention, the system can use different strategies for obtaining (or providing) the RDMA address for a message queue associated a target services when importing (or exporting) the target service.

The system can support data-dependent routing (DDR) across-domain. Using the bypass-domain model, a client can select a proper remote service (either directly or indirectly connected) according to the local DDR, since the domain gateway server can implement the DDR settings as defined in configuration file. For example, a domain gateway server can convert the DDR settings from a configuration file (e.g. a Tuxedo dmconfig file) into a local BB, which maintains information for the local DDR settings. Thus, the remote service invocation (e.g. a Tuxedo tpcall) can use the local BB for selecting a remote service, in a way similar to a local invocation.

Also, the system can exchange the access control (ACL) information. For example, when the domain gateway server exports a service, e.g. by exposing the RDMAQ address to a remote domain that imports the service, the domain gateway server can generate a key according to the configuration settings and provides the key to the remote domain. Then, the clients in the remote domain can invoke the remote service, e.g. making a tpcall, using the received key.

Furthermore, the system can support service fail-over. The domain gateway server can route a service request to a remote domain by checking the fail-over information (such as the fail-over number), which may not be available due to the importing of the remote service RDMAQ address to the local BB.

For example, when the domain gateway server imports the remote services, the domain gateway server checks the fail-over number for the imported services. If there are same (or similar) services existing, the system can treat the imported service as a fail-over service, in which case the domain gateway server may change the state of the imported service to "SUSPENDED" and sets proper loads.

Also, when the domain gateway server deletes a remote service, the domain gateway server checks whether the remote domain is the provider of the service to be deleted in (the top of) a fail-over link, and resume a remained service with the smallest fail-over number.

Furthermore, the system can delete the imported services from the remote domains. For example, the GWTDOMAIN A 613 can delete the imported services from the local BB A, when it shuts down.

Additionally, when the connection to a remote domain is down (either due to a network problem or because that the remote domain gateway is shut down), the system can delete all services that are related to the remote domain. Moreover, the system can check whether the remote domain is the provider of certain services in (the top of) a fail-over link, and resume a remained service with the smallest fail-over number.

Figure 7:
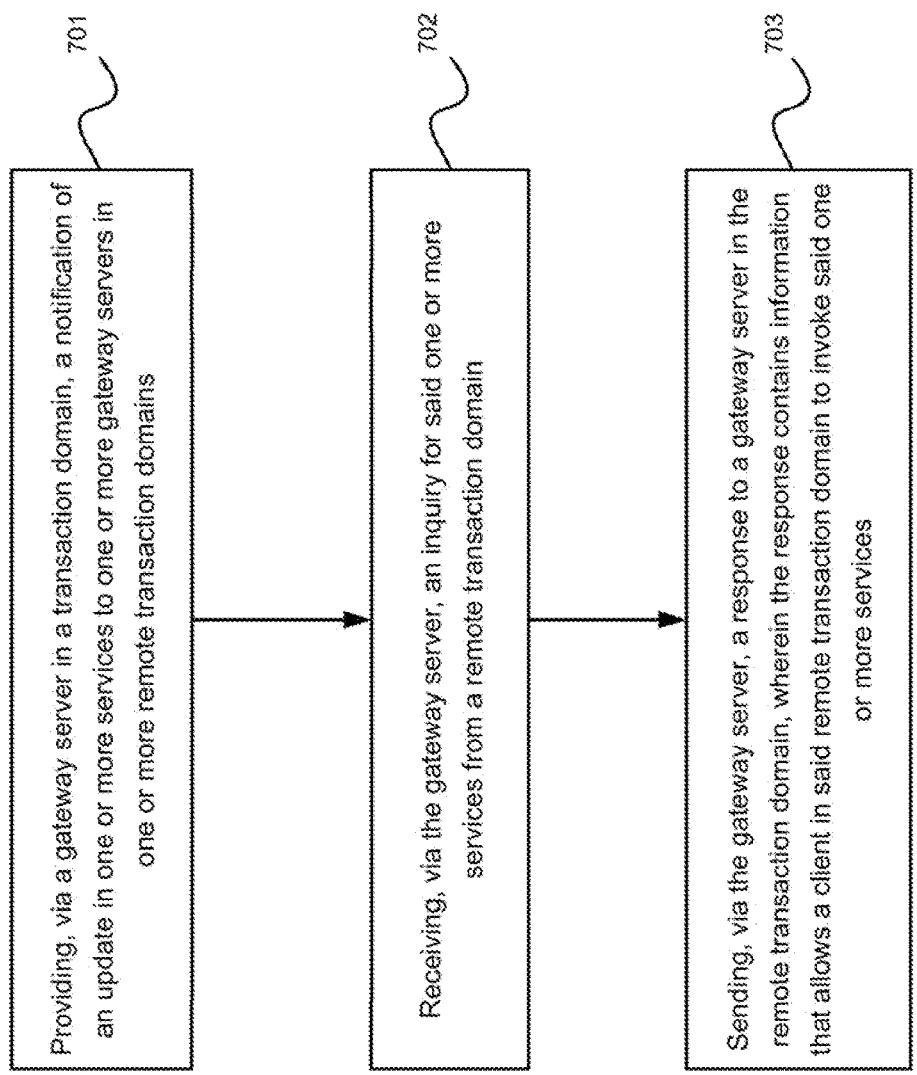
FIG. 7 illustrates an exemplary flow chart for sharing and updating the service information that supports across-domain messaging in a transactional middleware machine environment, in accordance with an embodiment of the invention.

FIG. 7 illustrates an exemplary flow chart for sharing and updating service information supporting across-domain messaging in a transactional middleware machine environment, in accordance with an embodiment of the invention. As shown in FIG. 7, at step 701, a gateway server in a transaction domain can notify an update in one or more services to one or more gateway servers in one or more remote transaction domains. Then, at step 702, the gateway server can receive an inquiry for said one or more services from a remote transaction domain. Furthermore, at step 403, the gateway server can send a response to a gateway server in the remote transaction domain, wherein the response contains information that allows a client in said remote transaction domain to invoke said one or more services.

Proxy Model

Figure 8:
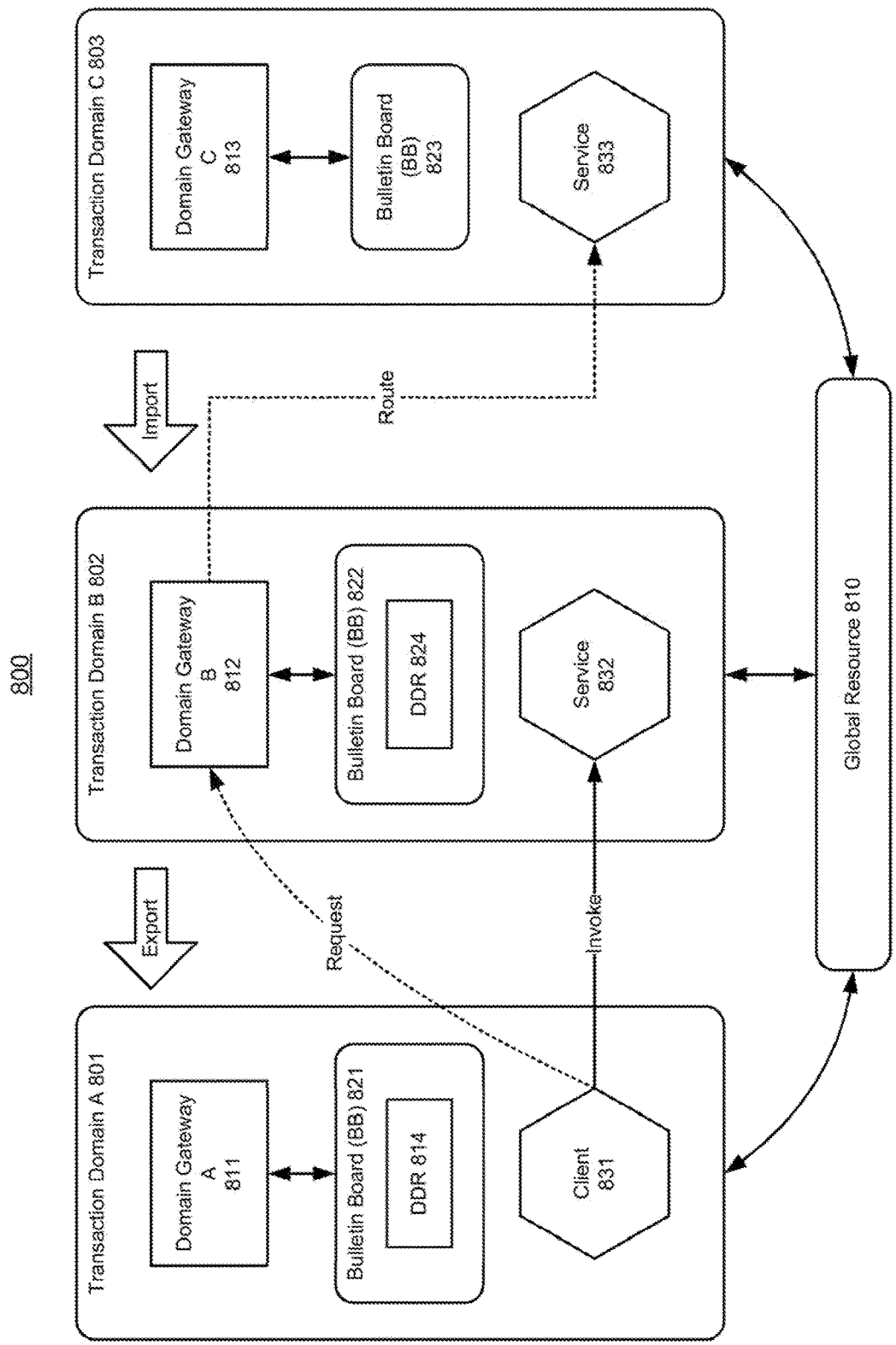
FIG. 8 shows an illustration of providing a proxy model in a transactional middleware machine environment, in accordance with an embodiment of the invention.

FIG. 8 shows an illustration of providing a proxy model in a transactional middleware machine environment, in accordance with an embodiment of the invention. As shown in FIG. 8, a transactional middleware machine environment 800, e.g. the Tuxedo environment, can include multiple domains, such as the transaction domains A-C 801-803 with the domain gateways A-C 811-813 and the bulletin board (BB) 821-823.

Furthermore, the different domains A-C 801-803 can share information in a global resource 810. For example, the Tuxedo system can use the network file system (NFS) for sharing the MID, GRPID, TMS, routing information.

As shown in FIG. 8, the transaction domain B 802 can export different services to various remote domains. For example, the transaction domain B 802 can export a service 823 to the transaction domain A 801. Also, the transaction domain B 802 can export a service 833, which is imported from another remote transaction domain C 803, to the transaction domain A 801 (using a proxy model).

In accordance with an embodiment of the invention, a client 831 can use the local BB 821 for selecting a remote service 832, in a way similar to a local invocation. The client 831 can use a data dependent routing (DDR) procedure for routing one or more messages across-domain. The DDR procedure can be based on the DDR settings 814 stored in the local BB 821 (which are converted from a configuration file).

Alternatively, the client 831 may select a remote service 833 according to the DDR settings 814. Using the proxy model, the transaction domain B 802 can export the service

833. The transaction domain B 802 may expose the RDMAQ address for the domain gateway B 812, which imported the service from the remote transaction domain C 803, instead of exposing the final RDMAQ address for the service 833.

Subsequently, when the client 831 invokes the service 833, the request (e.g. a tpcall) may be directed to the domain gateway B 812, which can route to the remote service 833 according to the DDR setting 824 stored in the local BB 822. (a.k.a. one-side-bypass-domain).

Figure 9:
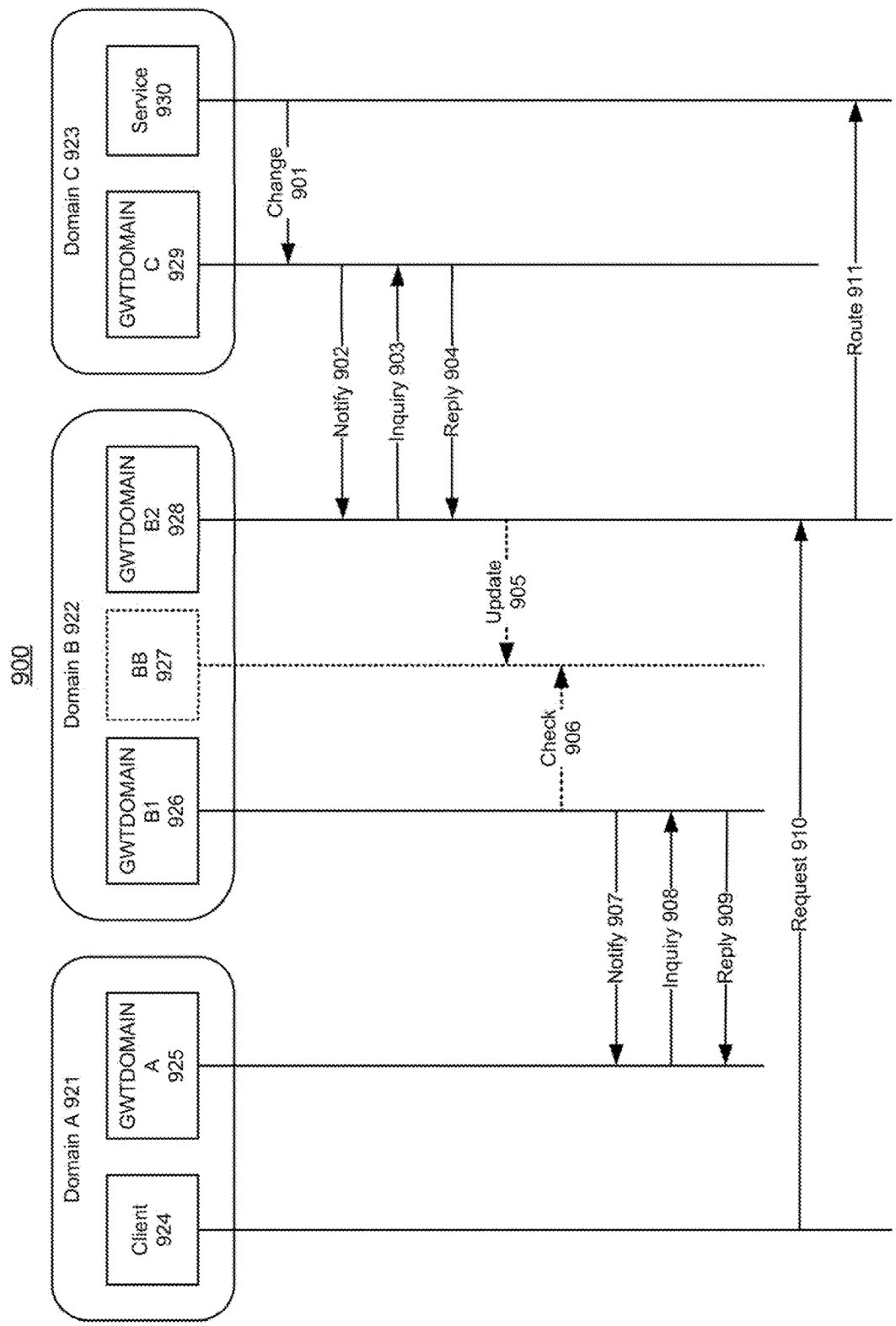
FIG. 9 shows an illustration of using a proxy model to support across-domain messaging in a transactional middleware machine environment, in accordance with an embodiment of the invention.

FIG. 9 shows an illustration of supporting across-domain messaging using a proxy model in a transactional middleware machine environment, in accordance with an embodiment of the invention. As shown in FIG. 9, a transactional middleware machine environment 900, e.g. the Tuxedo environment, can include multiple domains, such as the transaction domains A-C 921-923.

For example, the GWTDOMAIN B2 928 in the transaction domain B 922 can import a service 930 from the GWTDOMAIN C 929 in the transaction domain C 923. Furthermore, the GWTDOMAIN B1 926 in the transaction domain B 922 can export the service 930 to the GWTDOMAIN A 925 in the transaction domain A 921.

At step 901, the GWTDOMAIN C 929 in the transaction domain C 923 may detect a change associated with the service 930.

At step 902, the GWTDOMAIN C 929 can notify the GWTDOMAIN B2 928 in the transaction domain B 922 about the change in the service 930. Then, at step 903, the GWTDOMAIN B2 928 can send an inquiry message to the GWTDOMAIN C 929 for a list of services (including the service 930). Furthermore, at step 904, the GWTDOMAIN C 929 can provide the change in the service 930 to the GWTDOMAIN B2 928 in a reply.

At step 905, the GWTDOMAIN B2 928 updates the local BB 927 with the updated information about the service 930. At step 906, the GWTDOMAIN B1 926 can check the local BB 927 periodically.

At step 907, the GWTDOMAIN B1 926 can notify the GWTDOMAIN A 925 in the transaction domain A 921 about the update in the service 930. Then, at step 908, the GWTDOMAIN A 925 can send an inquiry message to the GWTDOMAIN B1 926 for a list of services (including the service 930).

Furthermore, at step 909, the GWTDOMAIN B1 926 can provide the update in the service 930 to the GWTDOMAIN A 925 in a reply. For example, the GWTDOMAIN B1 926 can expose, to the GWTDOMAIN A 925 in the transaction domain A 921, an address for a message queue that is associated with the GWTDOMAIN B2 928, which imports the service 930 from the remote transaction domain C 923.

At step 910, the client 924 can obtain the address for a message queue that is associated with the GWTDOMAIN B2 928 and sends a request to the GWTDOMAIN B2 928 for invoking the service 930.

Thus, at step 911, the GWTDOMAIN B2 928 can route the request to the service 930 in the transaction domain C 923.

Figure 10:
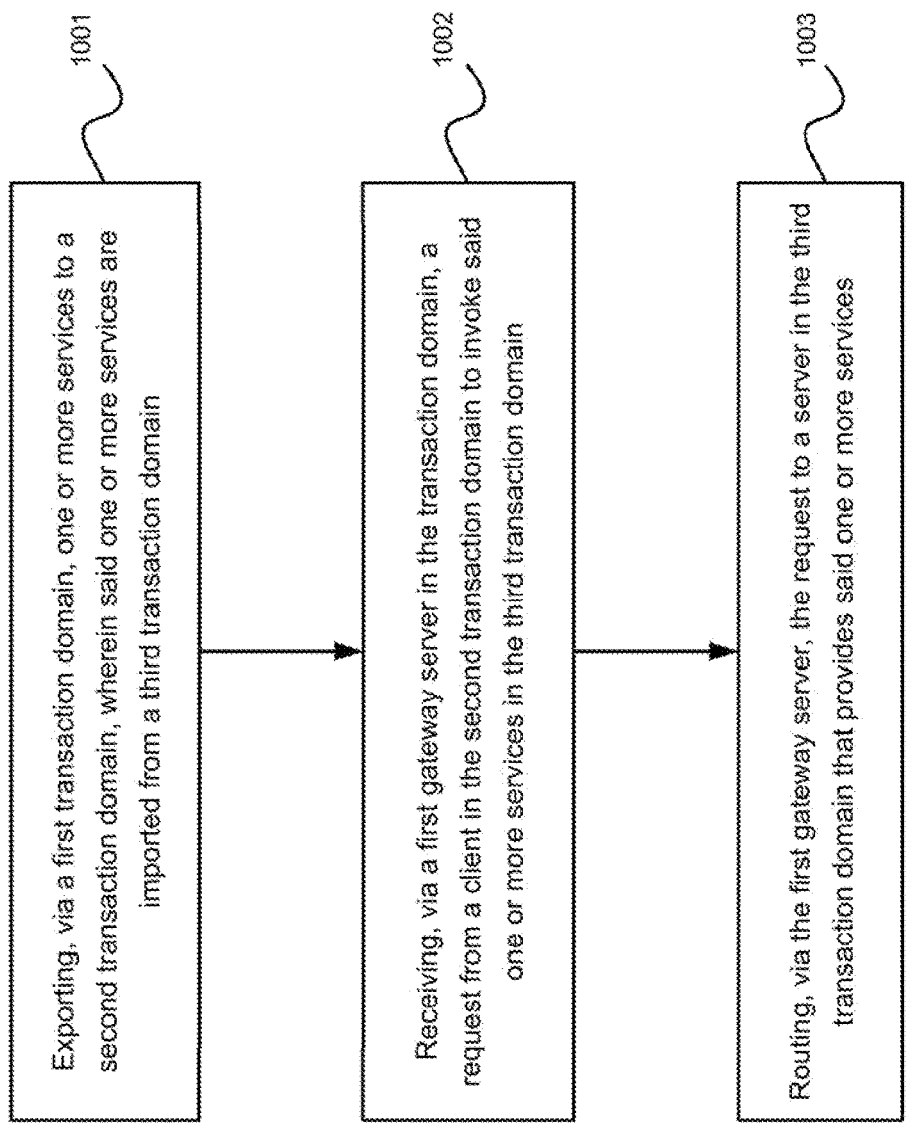
FIG. 10 illustrates an exemplary flow chart for using a proxy model to support across-domain messaging in a transactional middleware machine environment, in accordance with an embodiment of the invention.

FIG. 10 illustrates an exemplary flow chart for supporting across-domain messaging using a proxy model in a transactional middleware machine environment, in accordance with an embodiment of the invention. As shown in FIG. 10, at step 1001, the first transaction domain can export one or more services to a second transaction domain, wherein said one or more services are imported from a third transaction domain. Then, at step 1002, a first gateway server in the transaction domain can receive a request from a client in the second transaction domain to invoke said one or more services in the third transaction domain. Furthermore, at step 1003, the first gateway server can route the request to a server in the third transaction domain that provides said one or more services.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting across-domain messaging in a transactional middleware machine environment including a local transaction domain and a remote transaction domain, the method comprising:
    storing, in a storage resource that is accessible to the local transaction domain and to the remote transaction domain, service information pertaining to one or more services from the remote transaction domain, the service information including a remote direct memory address queue (RDMAQ) address for a target service that is provided by a remote server in the remote transaction domain;
    providing a gateway server in the local transaction domain;
    importing, by the gateway server in the local transaction domain, the service information;
    registering, by the gateway server in the local transaction domain, said service information in a service table that is associated with the local transaction domain, the service table stored in a memory shared across the local transaction domain;
    finding, by a client in the local transaction domain and from the service table, the RDMAQ address for the target service that is provided by the remote server in the remote transaction domain; and
    sending, by the client, a message directly to the RDMAQ address for the target service over a network connection via a remote direct memory access protocol operating as an upper-level protocol over the network connection to invoke the target service, whereby the sending the message directly to the RDMAQ address bypasses the gateway server in the local transaction domain.

2. The method according to claim 1, further comprising: including the local transaction domain and the remote transaction domain in a domain group, wherein each domain in the domain group is associated with a unique identifier (ID).

3. The method according to claim 1, further comprising: using the network file system (NFS) service to make the storage resource accessible to the local transaction domain and the remote transaction domain.

4. The method according to claim 3, further comprising: supporting the storage resource using at least one of a shared file and a server.

5. The method according to claim 1, wherein the service table is included in a bulletin board accessible by an ORACLE TUXEDO system.

6. The method according to claim 1, further comprising: obtaining, via the client, which commits a transaction, service information pertaining to one or more transaction management servers in both the transaction domain and the remote transaction domain that are involved in the transaction.

7. The method according to claim 1, further comprising: sending, by the client, another message to the remote server that provides the target service via the gateway server included in the transaction domain.

8. The method according to claim 1, wherein the RDAMQ address is based on a remote direct memory access (RDMA) protocol.

9. A system for supporting across-domain messaging in a transactional middleware machine environment, comprising:
    one or more microprocessors;
    a local transaction domain, including a gateway server operating in the local transaction domain and running on the one or more microprocessors;
    a storage resource that is accessible to the local transaction domain and to a remote transaction domain, wherein the storage resource stores service information pertaining to one or more services from the remote transaction domain, the service information including a remote direct memory address queue (RDMAQ) address for a target service that is provided by a remote server in the remote transaction domain;
    a memory shared across the local transaction domain and including a service table; and
    a client of the local transaction domain;
    wherein the gateway server operating in the local transaction domain:
        imports the service information from the storage resource; and
        registers the service information in the service table included in the memory shared across the local transaction domain; and
    wherein the client of the local transaction domain:
        finds, from the service table, the RDMAQ address for the target service that is provided by the remote server in the remote transaction domain; and
        sends a message directly to the RDMAQ address for the target service over a network connection via a remote direct memory access network protocol operating as an upper-level protocol over the network connection to invoke the target service, whereby sending the message directly to the RDMAQ address bypasses the gateway server in the local transaction domain.

10. The system according to claim 9, wherein:
    the local transaction domain and the remote transaction domain are in a domain group, and wherein each domain in the domain group is associated with a unique identifier (ID).

11. The system according to claim 9, wherein the network file system (NFS) service is used to make the storage resource accessible to the local transaction domain and the remote transaction domain.

12. The system according to claim 11, wherein:
    the storage resource is supported using at least one of a shared file and a server.

13. The system according to claim 11, wherein the service table is included in a bulletin board accessible by an ORACLE TUXEDO system.

14. The system according to claim 9, wherein:
    the client, which commits a transaction, operates to obtain service information pertaining to one or more transaction management servers in both the transaction domain and the remote transaction domain that are involved in the transaction.

15. The system according to claim 9, wherein:
the client operates to send another message to the remote server that provides the target service via the gateway server included in the transaction domain.

16. A non-transitory machine readable storage medium having instructions stored thereon that when executed cause a system including a local transaction domain and a remote transaction domain to perform the steps comprising:

storing, in a storage resource that is accessible to the local transaction domain and to the remote transaction domain, service information pertaining to one or more services from the remote transaction domain, the service information including a remote direct memory address queue (RDMAQ) address for a target service that is provided by a remote server in the remote transaction domain;

providing a gateway server in the local transaction domain;

importing, by the gateway server in the local transaction domain, the service information;

registering, by the gateway server in the local transaction domain, said service information in a service table that is associated with the local transaction domain, the service table stored in a memory shared across the local transaction domain;

finding, by a client in the local transaction domain and from the service table, the RDMAQ address for the target service that is provided by the remote server in the remote transaction domain; and sending, by the client, a message directly to the RDMAQ address for the target service over a network connection via a remote direct memory access protocol operating as an upper-level protocol over the network connection to invoke the target service, whereby the sending the message directly to the RDMAQ address bypasses the gateway server in the local transaction domain.

* * * * *

UNITED STATES PATENT AND TRADEMARK OFFICE
CERTIFICATE OF CORRECTION

PATENT NO. : 10,091,333 B2
APPLICATION NO. : 14/602037
DATED : October 2, 2018
INVENTOR(S) : Yang et al.

Page 1 of 1

It is certified that error appears in the above-identified patent and that said Letters Patent is hereby corrected as shown below:

In the Claims

In Column 14, Line 5, in Claim 8, delete "RDAMQ" and insert -- RDMAQ --, therefor.

Signed and Sealed this
Thirty-first Day of December, 2019

Andrei Iancu
*Director of the United States Patent and Trademark Office*